United States Patent [19]

Field et al.

[11] Patent Number: 4,789,485

[45] Date of Patent: Dec. 6, 1988

[54] CLARIFICATION OF BAYER PROCESS LIQUORS

[75] Inventors: John R. Field, Halifax; Gillian M. Moody, Brighouse; Trevor K. Hunter, Ilkley, all of Great Britain

[73] Assignee: Allied Colloids Ltd., Great Britain

[21] Appl. No.: 47,009

[22] PCT Filed: Jul. 17, 1986

[86] PCT No.: PCT/GB86/00417

§ 371 Date: Mar. 25, 1987

§ 102(e) Date: Mar. 25, 1987

[87] PCT Pub. No.: WO87/00825

PCT Pub. Date: Feb. 12, 1987

[30] Foreign Application Priority Data

Jul. 29, 1985 [GB] United Kingdom ............... 8519107

[51] Int. Cl.$^4$ ............................................. B01D 21/01
[52] U.S. Cl. .................................... 210/727; 210/734; 423/121; 423/122
[58] Field of Search ................... 209/5; 210/725, 727, 210/728, 734; 423/111, 121, 122, 130

[56] References Cited

U.S. PATENT DOCUMENTS

| | | | |
|---|---|---|---|
| 3,023,162 | 2/1962 | Fordyce et al. | 210/734 |
| 4,137,164 | 1/1979 | Coscia | 210/734 |
| 4,160,731 | 7/1979 | Doyle | 210/734 |
| 4,275,042 | 6/1981 | Lever | 423/130 |
| 4,396,752 | 8/1983 | Cabestany et al. | 210/734 |
| 4,545,902 | 10/1985 | Connelly et al. | 210/734 |
| 4,578,255 | 3/1986 | Roe et al. | 423/122 |
| 4,678,584 | 7/1987 | Brownrigg | 210/734 |

FOREIGN PATENT DOCUMENTS

2517314 6/1983 France.
50-96460 7/1975 Japan.

OTHER PUBLICATIONS

"Aluminum Production: Principles and Practice", by A. N. Adamson, The Chemical Engineer, Jun. 1970.

*Primary Examiner*—Peter Hruskoci
*Attorney, Agent, or Firm*—Ostrolenk, Faber, Gerb & Soffen

[57] ABSTRACT

The clarification of a sodium aluminate liquor in the Bayer Process, especially the liquor obtained by Kelly filter filtration of the supernatant from the primary settling stage, is improved by flocculation with a polymer of the formula $CH_2=C(R^1)CONHR^2NR^3R^4$ wherein $R^1$ is hydrogen or methyl, $R^2$ is straight or branched chain $C_{2-8}$ alkylene having at least 2 carbon atoms in the backbone and $R^3$ and $R^4$ are independently selected from $C_{1-4}$ alkyl.

21 Claims, No Drawings

CLARIFICATION OF BAYER PROCESS LIQUORS

The separation of inorganic suspended solids from an aqueous liquor is often promoted by the addition to the liquor of a polymeric flocculant that may be non-ionic, anionic or cationic.

When the liquor is alkaline, the flocculant is usually an anionic or non-ionic polymer but there have been some proposals to use a cationic polymer in alkaline liquors.

In U.S. Pat. No. 3,023,162, partially or wholly quaternised dialkylaminoalkyl (meth) acrylates are used for the flocculation of aqueous suspensions having pH from 9 to 14 and in which the suspended solids are organic (e.g., sewage) or inorganic (e.g., mineral dressing liquors).

In U.S. Pat. No. 4,160,731, a copolymer of acrylamide and 3(methacrylamido)-propyl-trimethyl ammonium chloride (MAPTAC) is used to promote dewatering of sewage sludge to which sufficient lime has been added to raise the pH to at least 12.

Particular problems arise in the clarification of Bayer Process liquors. The Bayer process is a widely used process for obtaining aluminium from bauxite by digesting the bauxite with sodium hydroxide to form a slurry of red mud, separating the red mud solids from the liquor, and then recovering the aluminium from the separated liquor. It is important that the liquor should be of high purity since impurities are carried into later stages of the aluminium recovery process and reduce the purity of the resultant aluminium and/or make the later recovery stages more difficult to operate. For instance the presence of inorganic suspended solids in the liquor is liable to lead to the contamination of the aluminium by, for instance, iron whilst the presence of dissolved organic materials such as humates is liable to interfere with the crystallisation during the recovery processes.

The separation of inorganic suspended solids is therefore usually conducted in two stages, namely a primary settlement stage to remove most of the suspended solids and a pressure filtration stage to clarify or polish the resultant liquor. Flocculants such as starch or sodium polyacrylate are generally used to promote the settlement stage but additional steps usually have to be taken to improve the effectiveness of the pressure filtration stage, for instance because the suspended particles are very fine, and conventionally a filter aid such as a calcium compound is added. Merely increasing the amount of anionic or non-ionic flocculant to the settler stage does not improve results, and generally makes them worse, both because of overdosing in this stage and because the extra amount of dissolved polymer is liable to increase the blinding of the filters.

In JP No. 5009646A, it is proposed to promote settlement of the red mud slurry in the primary settlement stage by addition of sodium polyacrylate followed by quaternised dialkylaminoalkyl(meth)acrylate.

In U.S. Pat. No. 4,578,255 (not published at the priority date of this application), it is proposed to remove humates from Bayer Process liquors by a particular process involving the addition of a water soluble, vinyl, polymeric quaternary ammonium salt. The only vinyl polymers which are shown to work satisfactorily are polymers of diallyl dimethyl ammonium chloride (DADMAC) and although some polymers having intrinsic viscosity (IV) up to 4.8 are mentioned, it is clear that best results are obtained with DADMAC polymers having IV up to about 1. No vinyl polymers other than DADMAC are mentioned in U.S. Pat. No. 4,578,255.

There is therefore still an urgent need to provide better clarification of sodium aluminate liquors, and in particular to promote better filtration since the present methods result in frequent blinding of the filter cloths thereby reducing the rate of flow through the filters and necessitating more frequent cleaning off of the cloths.

In the invention, inorganic suspended solids in a sodium aluminate liquor obtained in the Bayer Process are flocculated by addition of a flocculating agent and are separated from the liquor, and the flocculant comprises a quaternised polymer having intrinsic viscosity above 1 dl/g and which comprises quaternised recurring units derived from monomer of the formula

$$CH_2\!=\!C(R^1)CONHR^2NR^3R^4$$

wherein $R^1$ is hydrogen or methyl, $R^2$ is straight or branched chain $C_{2-8}$ alkylene having at least 2 carbon atoms in the backbone and $R^3$ and $R^4$ are independently selected from $C_{1-4}$ alkyl. $R^1$ is preferably methyl. $R^2$ may be for instance ethylene, isopropylene, t-butylene or 2-ethyl-1,6-hexylene, but is preferably 1,3-propylene. $R^3$ and $R^4$ are usually independently selected from methyl and ethyl. The preferred recurring unit is derived from dimethylaminopropyl methacrylamide (DMAPMA).

Suitable quaternising groups are $C_{1-4}$-alkyl or hydroxyalkyl, such as methyl, ethyl, propyl or 2-hydroxy ethyl, preferably methyl or ethyl. Suitable counterions are chloride, sulphate, methyl sulphate, acetate and nitrate. The recurring unit may for instance be quaternised with ethylene oxide or epichlorhydrin in an acid, to give the N-(2-hydroxyethyl) derivatives.

The quaternising groups may themselves contain quaternary nitrogen atoms, for instance as described in U.S. Pat. No. 4,495,367. Preferred quaternising compounds are methyl chloride and dimethyl sulphate.

The polymer may be a homopolymer of the specified units or a copolymer with other copolymerised ethylenically unsaturated monomers, generally other acrylic monomers, provided these other monomers do not significantly detract from the required properties of the polymer i.e. stability at high pH and temperature. In some instances, the homopolymers are preferred but copolymers are often more efficient commercially. Generally the polymer contains at least 10%, and preferably over 25 or 30%, of the specified quaternised units. Often the amount is over 50% and particularly good results are often achieved with above 80%, for instance 90 to 95% of the specified units (all percentages are by weight). Particularly preferred polymers are those formed of 95 to 25% by weight of the specified quaternised units and 5 to 75% by weight of ethylenically unsaturated comonomer. The comonomers are usually non-ionic and suitable comonomers include (meth)acrylamide, N-vinyl-N-methylacetamide, vinyl pyrollidone and vinyl acetate. Generally the comonomer is acrylamide.

The polymers have a high molecular weight, usually at least 500,000 and generally below 30 million. The intrinsic viscosity of the polymer must be at least 1 dl/g and is preferably at least 3 dl/g. Although it could be up to 30 dl/g, generally it is not above 8 or 10 dl/g. Good results are achieved in the range 4.5 to 8 dl/g but values of 3 to 5 dl/g are often commercially adequate. It is normally preferred for the polymers to have conventional high solubility and linearity but small amounts of deliberate cross linking or chain branching may be provided, for instance as described in our European patent application No. 86302987.2.

The polymers can be made by conventional techniques such as aqueous gel polymerisation followed by drying and comminution or by reverse phase polymerisation often followed by azeotropic distillation, either to give a stable suspension of polymer in non-aqueous liquid or to provide dry beads that can then be separated from the non-aqueous liquid. It is often preferred to make the polymer as a stable suspension in oil of small (e.g., below 4 μm) particles by reverse phase polymerisation, generally followed by azeotropic distillation.

The polymer can be added to the sodium aluminate liquor in conventional manner, generally as a dilute aqueous solution formed by dissolving solid polymer in water or by mixing into water a reverse phase suspension of polymer, often in the presence of oil-in-water emulsifier.

The invention can be applied to the separation of inorganic suspended solids from any sodium aluminate liquor. In practice this will usually have a pH of above 11 and usually above 13, for instance at least 13.5 and often at least 14. A particular advantage of the invention is that the process is effective even when the liquor has an elevated temperature, for instance above 60° C. and often above 80° C. Typically the liquor can have a temperature of at least 95° C. and satisfactory results can be obtained at temperatures of up to 115° C. or more.

The sodium aluminate liquor can be any of the caustic sodium aluminate liquors that are obtained in the Bayer Process and from which it is necessary to separate inorganic suspended solids but preferably it is the slurry obtained by digesting bauxite with sodium hydroxide, optionally with subsequent dilution. This slurry is then subjected to a primary separation stage at which red mud is separated from it and is subsquently subjected to one or more washing stages. The liquor leaving the primary settlement stage normally contains below 0.3% by weight suspended inorganic solids and is then subjected to a pressure filtration stage to achieve clarification or polishing of the liquor to reduce the suspended solids content still further. The use of the quaternised polymer of the invention is manifested particularly at this stage, i.e., it promotes filtration and gives particularly good clarity and low solids content in the filtered liquor.

The invention can be performed by adding the quaternised polymer to the liquor from the primary separation stage, in which event that stage may be conducted using conventional anionic or non-ionic flocculants, such as starch or sodium polyacrylate. However good results, and in many instances improved results, are obtained if the quaternised polymer is added before the primary separation stage. Although separation can be achieved using the quaternised polymer as the sole flocculant, it is generally desirable to accelerate the separation by using it in combination with a conventional non-ionic or anionic flocculant, best results generally being achieved by adding the quaternised polymer before adding the anionic or non-ionic flocculant. Suitable flocculants that can be used with the quaternised polymer include starch and water soluble anionic synthetic polymers such as homopolymer or copolymers of acrylic or methacrylic acid or other ethlenically unsaturated carboxylic or sulphonic acids (generally as the sodium or other water soluble salt) or sulphomethylated acrylamide.

The pressure filtration is generally conducted by a Kelly filter and the resultant liquor is then usually passed to a stage at which alumina hydrate is precipitated from it.

Although the process is of particular value in promoting the rate of filtration and the quality of the filtered sodium aluminate liquor, the process is also of use in other stages where adequate separation can be achieved by settlement, without filtration. A particular advantage of the invention is that good clarity is obtained without blinding the filter, and so good filtration rates can be achieved.

The following examples illustrate the invention. In these:

MAPTAC—3-(methacrylamido)propyl trimethyl ammonium chloride.
DADMAC—diallyl dimethyl ammonium chloride
DMAEA.MeClq—dimethyl amino ethyl acrylate quaternised with methyl chloride
Acm—acrylamide All monomer ratios in the following list are by weight. The following polymers are tested;
A—MAPTAC homppolymer prepared by gel polymerisation IV 5.1 dl/g (invention).
B—70:30 MAPTAC: Acm copolymer IV 5.0 dl/g (invention).
C—DADMAC polymer IV <1 dl/g.
D—30:70 DMAEA.MeClq:Acm copolymer IV 5.0 dl/g.
E—42:58 DMAEA.MeClq:Acm copolymer IV 8.0 dl/g.
F—DMAEMA.MeClq homopolymer IV <1 dl/g.
G—Sodium acrylate homopolymer IV 13.2 dl/g.
H—Sodium acrylate homopolymer IV 5.0 dl/g.
I—70:30 sodium acrylate:Acm copolymer IV 9.0 dl/g.
J—dimethylamine/epichlorhydrin condensation polymer IV <1 dl/g.
K—95:5 MAPTAC:Acm prepared by reverse phase polymerisation followed by azeotropic distillation. IV 4.7 dl/g (invention).

EXAMPLE 1

The process comditions in a Bayer process for the recovery of alumina were simulated by making a suspension of 20 g/l of china clay in a 200 g/l sodium hydroxide solution and the suspension was settled using 3 mg/l of product G. The supernatant remaining after settlement, which had a turbidity of 20 NTU and a suspended solids content well below 0.3% by weight, was collected as 500 ml aliquots in 600 ml tall form beakers. Each of the aliquots was treated with the test flocculant at doses of 0.1, 0.25 and 0.5 mg/l (with the last of these doses being applied by a two stage addition of 0.25 plus 0.25 mg/l) whilst stirring hard. After 2 mins of hard stirring, the stirrer speed was reduced and stirring continued for 15 minutes during which period the stirring was stopped at intervals of 5, 10 and 15 minutes to allow settlement, and samples of the supernatant were used for turbidity measurements.

The results are as follows:

TABLE 1

| Product | Dose mg/l | Turbidity (NTU) after stirring for:- | | |
|---|---|---|---|---|
| | | 5 mins | 10 mins | 15 mins |
| A | 0.1 | 19.8 | 19.0 | 19.0 |

TABLE 1-continued

| Product | Dose mg/l | Turbidity (NTU) after stirring for:- 5 mins | 10 mins | 15 mins |
|---|---|---|---|---|
|   | 0.25 | 16.5 | 16.5 | 15.0 |
|   | 0.5 | 6.6 | 6.2 | 5.3 |
| C | 0.1 | 20.5 | 20.0 | 19.0 |
|   | 0.25 | 19.0 | 19.0 | 18.5 |
|   | 0.5 | 19.0 | 17.5 | 17.0 |
| G | 0.1 | 19.0 | 18.5 | 17.0 |
|   | 0.25 | 19.0 | 19.0 | 19.0 |
|   | 0.5 | 19.0 | 16.0 | 15.0 |

The low turbidity obtained with polymer A, the MAPTAC homopolymer of IV about 5, shows the benefit obtained from the invention compared to the use of a further dosage of polymer G, sodium polyacrylate, or from the use of the DADMAC polymer, polymer C. This demonstrates that irrespective of the effect of the DADMAC polymer on the dissolved humate content (see U.S. Pat. No. 4,578,255), the process of the invention gives greatly reduced suspended solids compared to the process of U.S. Pat. No. 4,578,255.

EXAMPLE 2

The process of example 1 was repeated but with stagewise addition of polymer doses throughout, i.e. 0.25+0.25+0.5 mg/l, the polymer being added as 0.05 g/l solution. The results were as follows:

TABLE 2

| Product | Dose (mg/l) | Turbidity (NTU) after stirring for:- 5 min | 10 min |
|---|---|---|---|
| B | 0.25 | 17.0 | 12.0 |
|   | 0.50 | 8.0 | 6.4 |
|   | 1.00 | 5.9 | 5.2 |
| C | 0.25 | 19.0 | 18.0 |
|   | 0.50 | 19.0 | 18.0 |
|   | 1.00 | 21.0 | 32.0 |
| D | 0.25 | 19.0 | 18.0 |
|   | 0.50 | 15.5 | 15.5 |
|   | 1.00 | 15.5 | 15.0 |
| E | 0.25 | 18.5 | 18.0 |
|   | 0.50 | 15.0 | 15.0 |
|   | 1.00 | 14.5 | 13.5 |
| F | 0.25 | 17.5 | 17.0 |
|   | 0.50 | 13.0 | 12.0 |
|   | 1.00 | 9.2 | 8.4 |
| G | 0.25 | 19.0 | 19.0 |
|   | 0.50 | 16.5 | 16.0 |
|   | 1.00 | 12.5 | 12.0 |
| H | 0.25 | 19.0 | 18.0 |
|   | 0.50 | 16.0 | 13.5 |
|   | 1.00 | 15.0 | 11.5 |
| I | 0.25 | 20.0 | 18.5 |
|   | 0.50 | 17.0 | 16.5 |
|   | 1.00 | 15.5 | 15.5 |
| J | 0.25 | 19.0 | 17.5 |
|   | 0.50 | 16.5 | 15.5 |
|   | 1.00 | 17.0 | 16.0 |

This again demonstrates the effectiveness of the invention (using the 70% MAPTAC copolymer B) compared to the use of the DADMAC polymer C or the other cationic polymers D to F or J, or anionic polymers G, H or I. Although the dimethylaminoethyl methacrylate polymer F gave better results than the other cationic polymers, they were inferior to the results obtained with the MAPTAC polymer B.

EXAMPLE 3

The process of example 2 was repeated except that the liquor was maintained at 90° C.
The results were as follows:

TABLE 3

| Product | Dose mg/l | Turbidity (NTU) after stirring for:- 5 mins | 10 mins |
|---|---|---|---|
| B | 0.25 | 5.8 | 4.2 |
|   | 0.50 | 1.8 | 1.9 |
|   | 1.00 | 1.1 | 1.5 |
| G | 0.25 | 8.4 | 8.6 |
|   | 0.50 | 8.8 | 9.0 |
|   | 1.00 | 8.8 | 8.0 |

This demonstrates the very good clarification obtained at high temperatures using the MAPTAC copolymer B compared to the poor results using sodium polyacrylate G.

EXAMPLE 4

The process of example 3 was repeated with 10 minutes total stirring for a range of MAPTAC homopolymers and copolymers of different IV values. The results are shown in Table 4 in which the amount of MAPTAC is given in percent by weight, the remainder of the polymer being derived from acrylamide. The turbidity without the polymer addition was 20 NTU.

TABLE 4

| % MAPTAC | IV | Floc Size | Dose (mg/l) | Turbidity (NTU) |
|---|---|---|---|---|
| 100 | 2.9 | small | 0.2 | 3.8 |
|   |   | small | 0.5 | 2.9 |
| 25 | 10 | medium/large | 0.2 | 2.8 |
|   |   | medium/large | 0.5 | 2.3 |
| 25 | 7.5 | medium/large | 0.2 | 2.8 |
|   |   | medium/large | 0.5 | 2.2 |
| 50 | 7 | large | 0.2 | 2.5 |
|   |   | large | 0.5 | 2.1 |
| 90 | 4 | small | 0.2 | 2.6 |
|   |   | small | 0.5 | 3.2 |
| 100 | 3.9 | small | 0.2 | 2.6 |
|   |   | small | 0.5 | 2.6 |
| 50 | 7.3 | large | 0.2 | 2.3 |
|   |   | large | 0.5 | 2.2 |
| 50 | 7.4 | large | 0.2 | 2.2 |
|   |   | large | 0.5 | 2.1 |
| 25 | 10.5 | large | 0.2 | 2.3 |
|   |   | large | 0.5 | 2.05 |
| 100 | 1.3 | small | 0.2 | 3.2 |
|   |   | small | 0.5 | 2.4 |
| 70 | 5 | medium | 0.2 | 2.0 |
|   |   | medium | 0.5 | 1.95 |

This demonstrates the benefits, from the point of view of floc size and therefore potential filtration rates, of the use of copolymers of MAPTAC with polyacrylamide.

EXAMPLE 5

A liquor was prepared and settled as in example 1 but using 4 mg/l of product G, various amounts of test polymers were added to the supernatant and it was then subjected to vacuum filtration. When no polymer addition was made, the filtration time was 32 seconds, but with the various MAPTAC copolymers shown in Table 4 and with polymer F filtration times were reduced by around 10 second or more with polymer dosages ranging from 0.1 to 1 mg/l.

EXAMPLE 6

A 50% dispersion in oil of a copolymer of 95% MAPTAC and 5% acrylamide and having IV 4.7 was prepared by reverse polymerisation followed by azeotropic distillation. The product was labelled polymer K.

A suspension of 10 g/l china clay in 200 g/l sodium hydroxide was formed and DADMAC polymer C or MAPTAC polymer K was stirred into the suspension vigorously using a laboratory gang stirrer for 10 minutes. This was followed by 0.5 mg/l product G (sodium polyacrylate). Fast stirring was continued for a further minute before reducing to slow stirring for 15 minutes. The product was then settled and the turbidity was observed.

In a comparison, product G was added before the settling but products C and K were added after the settling. The results are shown in Table 5 in which turbidity "before" indicates the turbidity obtained when the polymers C and K are added before settling and turbidity "after" when they are added after settling.

TABLE 5

| Product | Dose mg/l | Turbidity (NTU) Before | After |
|---------|-----------|------------------------|-------|
| C | 0.25 | 22.5 | 26.5 |
| C | 0.5 | 13.0 | 28 |
| C | 1.0 | 14.0 | 32 |
| C | 2.0 | 11.0 | 32 |
| K | 0.25 | 16.5 | 15.5 |
| K | 0.5 | 12.0 | 14.5 |
| K | 1.0 | 8.3 | 15.0 |
| K | 2.0 | 6.8 | 15.0 |

This clearly demonstrates the benefit of adding the MAPTAC copolymer of the invention, and in particular of adding it before the settling.

What is claimed is:

1. A process for separating inorganic suspended solids in a sodium aluminate liquor obtained in a Bayer Process wherein an effective amount of a flocculatng agent is added to the liquor containing suspended solids, the flocculating agent comprising a quaternised polymer having an intrinsic viscosity (IV) above 1 dl/g and having at least about 25% by weight quaternised recurring units derived from monomers of the formula $$CH_2=C(R^1)CONHR^2NR^3R^4$$

wherein $R^1$ is hydrogen or methyl, $R^2$ is straight or branched chain $C_{2-8}$ alkylene having at least 2 carbon atoms in the backbone and $R^3$ and $R^4$ are independently selected from $C_{1-4}$ alkyl, and the flocculated suspended solids are separated from the liquor.

2. A process according to claim 1 in which the liquor is the slurry obtained by digesting bauxite with sodium hydroxide and the separation is conducted in two stages comprising a primary separation stage and a pressure filtration step.

3. A process according to claim 2 in which the quaternised polymer is added before the primary separation stage.

4. A process according to claim 3 in which the flocculant also includes at least one of non-ionic and anionic polymeric flocculant added before the primary stage.

5. A process according to claim 4 in which the quaternised polymer is added before the non-ionic or anionic polymeric flocculant.

6. A process according to claim 2 in which the quaternised polymer is added after the primary separation stage and before the filtration stage.

7. A process according to claim 1 or claim 6 in which the quaternised polymer is added to a sodium aluminate liquor containing below 0.3% suspended inorganic solids and the liquor is then subjected to pressure filtration.

8. A process according to claim 7 in which filtration is by a Kelly filter.

9. A process according to claim 1 in which $R^1$ is hydrogen or methyl, $R^2$ is 1,3-propylene and $R^3$ and $R^4$ are methyl.

10. A process according to claim 9 in which the quaternerized polymer is derived from 95 to 25% by weight of the quaternized monomer units and 5 to 75% by weight of ethylenically unsaturated non-ionic comonomer.

11. A process according to claim 10 in which the comonomer is acrylamide.

12. A process according to claim 11 in which the polymer has an IV of 3 to 10.

13. A process according to claim 1 in which the polymer is quaternised by methyl chloride.

14. A process according to claim 1 in which the quaternised polymer is derived from 95 to 25% by weight of the quaternised monomer units and 5 to 75% by weight of ethylenically unsaturated non-ionic comonomer.

15. A process according to claim 14 in which the comonomer is acrylamide.

16. A process according to claim 1 in which the polymer has IV of 3 to 10.

17. A process according to claim 1 in which the liquor has a temperature of at least 60° C. and pH of at least 13.

18. A process for separating inorganic suspended solids from a sodium aluminate liquor obtained in a Bayer process wherein an effective amount of a flocculating agent is added to the liquor containing the suspended solids, the flocculating agent comprising a quaternised polymer having an intrinsic viscosity of above 1 dl/g and having from 95 to 25% by weight quaternised recurring groups derived from monomers of the formula $$CH_2=C(R_1)CONHCH_2CH_2CH_2N(CH_3)_2$$

wherein $R_1$ is hydrogen or methyl, and the flocculated suspended solids are separated from the liquor.

19. A process according to claim 18 in which the polymer is quaternised by methyl chloride.

20. A process according to claim 18 in which the comonomer is acrylamide.

21. A process according to claim 18 in which the polymer has an intrinsic viscosity of 3 to 10.

* * * * *